(12) United States Patent
Berrocal

(10) Patent No.: US 12,680,948 B2
(45) Date of Patent: Jul. 14, 2026

(54) GRATING FOR OPTICAL MEASUREMENTS, AN ASSEMBLY FOR MEASUREMENTS OF ONE OR MORE OPTICAL PARAMETERS OF A MEDIUM AND A METHOD OF USING THE ASSEMBLY

(71) Applicant: Spec-Imaging AB, Lund (SE)

(72) Inventor: Edouard Jean Jacques Berrocal, Lund (SE)

(73) Assignee: Spec-Imaging AB, Lund (SE)

( * ) Notice: Subject to any disclaimer, the term of this patent is extended or adjusted under 35 U.S.C. 154(b) by 153 days.

(21) Appl. No.: 18/578,351

(22) PCT Filed: Jul. 8, 2022

(86) PCT No.: PCT/SE2022/050705
§ 371 (c)(1),
(2) Date: Jan. 11, 2024

(87) PCT Pub. No.: WO2023/287343
PCT Pub. Date: Jan. 19, 2023

(65) Prior Publication Data
US 2024/0255417 A1     Aug. 1, 2024

(30) Foreign Application Priority Data
Jul. 12, 2021     (SE) .................................... 2150927-8

(51) Int. Cl.
*G01N 21/31*          (2006.01)
(52) U.S. Cl.
CPC ..... *G01N 21/31* (2013.01); *G01N 2201/0635* (2013.01)

(58) Field of Classification Search
CPC ....... G01J 2003/1847; G01J 2003/2813; G01J 3/1804; G01N 21/31; G01N 21/49; G01N 21/64; G01N 2201/0635; G02B 5/1861
See application file for complete search history.

(56) References Cited

U.S. PATENT DOCUMENTS

| | | | |
|---|---|---|---|
| 5,216,257 A | 6/1993 | Brueck et al. | |
| 5,422,723 A | 6/1995 | Paranjpe et al. | |

(Continued)

FOREIGN PATENT DOCUMENTS

| | | |
|---|---|---|
| KR | 20180047776 A | 5/2018 |
| WO | 2012015344 A1 | 2/2012 |
| WO | 2020180233 A1 | 9/2020 |

OTHER PUBLICATIONS

Extended Search Report dated Mar. 21, 2025; European Patent Application No. 22842562.5. 7 pages.

(Continued)

*Primary Examiner* — Hina F Ayub
(74) *Attorney, Agent, or Firm* — McDonald Hopkins LLC

(57)          ABSTRACT

The disclosure relates to a grating for optical measurements comprising: a base plate extending in a plane in two spatial directions; a plural number q of periodic patterns, each with a surface and space periodic wave optical mask and each with a different interval frequency; wherein the periodic patterns are arranged adjacent each other in the base plate. The disclosure further relates to a grating, an assembly for measurements of one or more optical parameters of a medium and a method of using the assembly.

13 Claims, 4 Drawing Sheets

(56)     References Cited

U.S. PATENT DOCUMENTS

| 6,088,103 | A | 7/2000 | Everett et al. |
| 2005/0058352 | A1 | 3/2005 | Deliwala |
| 2005/0185179 | A1* | 8/2005 | Wang ...................... G01J 3/433 |
| | | | 356/330 |
| 2006/0244950 | A1 | 11/2006 | Wegmann |
| 2018/0052048 | A1* | 2/2018 | Roh ...................... G01J 3/0278 |
| 2021/0199942 | A1 | 7/2021 | Siebenmorgen et al. |

OTHER PUBLICATIONS

Patent Cooperation Treaty (PCT), International Search Report and Written Opinion for Application PCT/SE2022/050705 filed Jul. 8, 2022, mailed Oct. 18, 2022, International Searching Authority, SE.

* cited by examiner

GRATING FOR OPTICAL MEASUREMENTS, AN ASSEMBLY FOR MEASUREMENTS OF ONE OR MORE OPTICAL PARAMETERS OF A MEDIUM AND A METHOD OF USING THE ASSEMBLY

CROSS-REFERENCE TO RELATED APPLICATION

This application is a 35 U.S.C. § 371 national stage application of PCT/SE2022/050705 filed Jul. 8, 2022, which claims priority to and the benefit of Swedish Patent Application No. 2150927-8 filed on Jul. 12, 2021, each of which are incorporated herein in their entireties by reference.

TECHNICAL FIELD

The present disclosure relates to a grating for optical measurements, an assembly for measurements of one or more optical parameters of a medium and a method of using the assembly. More specifically, the disclosure relates to a grating for optical measurements, an assembly for measurements of one or more optical parameters of a medium and a method of using the assembly as defined in the introductory parts of the independent claims.

BACKGROUND ART

In some conventional approaches to spectrophotometric measurements, monochromatic light (e.g., selected from a polychromatic light source) is used to illuminate a medium under examination, and a photodetector is placed on the opposite side of the medium compared to the illuminated side to record the remaining light intensity after passing through the sample. An absorption or attenuation coefficient of the medium may be determined for the wavelength of the monochromatic light by calculating a ratio between light intensity before and after passing of the sample.

More elaborate approaches to spectrophotometric measurements are also known. For example, a system for measuring optical properties of a medium, which applies monochromatic light, is described in WO 2012/015344 A1. A further example, an assembly for spectrophotometric measurements of turbid samples, is disclosed in WO 2020/180233 A1. There, spatially modulated illumination is employed to mark incident illumination, allowing unwanted multiply scattered light to be suppressed.

A problem with prior art solutions to spectrophotometric measurements is efficiency for performing the measurements and accuracy of the archived results.

Therefore, there is a need for alternative approaches to spectrophotometric measurements. The need may be particularly prominent for measurements on turbid media.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an assembly is referred to herein, it is to be understood as a physical product; e.g., an apparatus. The physical product may comprise one or more parts. In some embodiments the parts may comprise controlling circuitry in the form of one or more controllers, one or more processors, or the like.

It is an object of the present disclosure to mitigate, alleviate or eliminate one or more of the above-identified deficiencies and disadvantages in the prior art and solve at least the above mentioned problem.

According to a first aspect there is provided a grating for optical measurements comprising: a base plate extending in a plane in two spatial directions; a plural number q of periodic patterns, each with a surface and space periodic wave optical mask and each with a different interval frequency; wherein the periodic patterns are arranged adjacent each other in the base plate.

According to some embodiments there is provided a grating for optical measurements. The grating comprises a base plate extending in a plane in two spatial directions and a plural number n of first periodic patterns, each with a surface and space periodic wave optical mask of the same interval frequency. The first periodic patterns are arranged adjacent each other in the base plate with a first phase shift between the masks of adjacent first periodic patterns.

According to some embodiments, the first phase shift is $360/n$ degrees.

According to some embodiments, the periodic patterns is comprised in the group consisting of: Ronchi masks, sinusoidal masks, triangular masks, or any periodical pattern mask.

According to some embodiments, the grating comprises a plural number m of second periodic patterns, each with a surface and space periodic wave optical mask of the same first interval frequency; wherein the second periodic pattern is arranged adjacent each other in the base plate with a second phase shift between the masks of adjacent first periodic patterns; wherein the block of second periodic patterns are arranged adjacent the block of first periodic patterns.

According to some embodiments, the second phase shift is $360/m$ degrees.

According to some embodiments, each first periodic pattern and each second periodic pattern have a width of less than 50 mm in the third spatial dimension.

According to some embodiments, each first periodic pattern and each second periodic pattern have a width of less than 10 mm in the third spatial dimension.

According to some embodiments, each first periodic pattern and each second periodic pattern have a width of less than 5 mm in the third spatial dimension.

According to some embodiments, each first periodic pattern and each second periodic pattern have a width of more than 2 mm in the third spatial dimension.

According to a second aspect there is provided an assembly for measurements of one or more optical parameters of a medium. The assembly comprises a light profile generator configured to provide a polychromatic light profile, wherein the polychromatic light profile has a propagation path in a second spatial dimension. The assembly further comprises a light intensity modulator configured to provide an intensity modulated polychromatic light profile by applying—to the polychromatic light profile—an intensity modulation having a periodical, or substantially periodical, pattern in the first spatial dimension. The assembly further comprises a holder for a sample of the medium, configured to enable the intensity modulated polychromatic light sheet to illuminate the sample; and an optical sensor configured to record intensity of light exiting the sample over the light spectrum for provision of the one or more optical parameters. The light intensity modulator comprises an optical holder for a grating, the optical holder being electronically controlled and movable in a third spatial dimension; and a grating according to the first aspect arranged in the optical holder for providing the intensity modulation to the polychromatic light profile.

According to some embodiments, the light profile generator is configured to provide a polychromatic light sheet the assembly comprising a light spectrum extending in a first spatial dimension.

An advantage of the present disclosure is that alternative approaches to spectrophotometric measurements are provided. Periodic patterns of the grating makes it possible to efficiently suppress unwanted effects from multiple light scattering as known in the prior art. Having a plurality of periodic patterns with different frequencies in the grating opens a possibility of using a horizontal displacement of the grating with a plurality of periodic patterns to measure subsequent 1-phase measurements. Fast measurements at multiple frequencies can be then be made using FFT post processing to extract the end result for each frequency. Enabling fast measurements at multiple frequencies makes it possible to measure the extinction coefficient of light traveling through a sample.

A periodic pattern of the grating makes it possible to efficiently suppress unwanted effects from multiple light scattering as known in the prior art. This comes at the cost of losing end result data for the parts shadowed by the grating. The disclosed grating enables to produce a phase shift in the light passing through it by moving the grating in the third spatial dimension to the next first periodic pattern. In that way a measurement without loss of data can be achieved by adding the phase shifted measurements to each other in a combined image.

By having a phase shift between adjacent first periodic patterns in the grating that is 360 degrees divided by then number n of first periodic patterns, measurements may be made without any shadowed parts by adding phase shifted images to a combined image. If n is 3 or greater the non-shadowed parts will be increasingly overlapping with a greater n.

For absorption measurements a grating with n=two first periodic patterns, inducing two phases, works well. When doing two-dimensional measurements it is preferred to have at least three phases to produce good measurements, i.e. a grating according to this disclosure where n is at least three.

Compared to prior art solutions for doing measurements where the light pattern is phase shifted, the present disclosure is much simpler. The translation of the grating in the third spatial direction is simple, can easily be performed fast and does not have to be very precise as long as the light passing through the grating passes through the next first periodic pattern for each translation movement.

In embodiments where a plurality of second periodic patterns are present, a second measurement may be made with a different frequency of the modulation providing an improved scattering filtering effect. By having a grating with phase shifted periodic patterns in a plurality of blocks having different frequencies of the periodic patterns, a simple frequency shift is achieved in addition to the already mentioned phase shift.

For absorption measurement a round light profile of the light propagating through the assembly is often used. The width w of each first periodic pattern and/or second periodic pattern then need to be at least as wide as the diameter of the light profile, preferably less than 50 mm. For two-dimensional measurement where a polychromatic light sheet is used, the width w may be less than 5 mm as the light sheet is often very thin. A minimized width w for the used light profile will decrease the distance that the grating has to be moved for inducing a phase shift on the propagating light. However, to reduce the precision demands of the translation it is preferred to have a width that is larger than the width of the light profile.

According to a third aspect there is provided a method of using the assembly according to the first aspect for measuring one or more optical parameters of a medium. The method comprises providing the holder with a sample of the medium and iterating at least n times the following steps: moving the optical holder of the light intensity modulator in the third spatial dimension so that light propagating in the assembly hits the next subsequent first periodic pattern of the grating or, if present, second periodic pattern thereby applying a modulation phase shift to the previous periodic pattern for light passing through the grating; illuminating the sample by the polychromatic light sheet provided by the light sheet generator and the light intensity modulator of the assembly; recording, by the optical sensor of the assembly, at least one measurement of intensity of light exiting the sample opposite to the illumination and intensity of light exiting the sample substantially orthogonal to the polychromatic light sheet for each of the first periodic pattern and, if present, second periodic pattern during the periodic movement of the optical holder; and determining the one or more optical parameters based on the recorded measurements.

When the iteration has been made n times, all phases of the first periodic pattern and, if present, the second periodic pattern of the grating are recorded and the one or more optical parameter can be calculated from the n recordings thereby compensating parts shadowed by the grating in single recordings.

According to some embodiments, the recorded measurement is an image.

According to some embodiments, the iteration of the step of moving the optical holder is performed in one direction along the third spatial dimension until reaching the last position for the first periodic pattern of the grating or, if present, the second periodic pattern, and, after reaching the last position, change the movement direction for the next iteration to the opposite direction along the third spatial dimension until reaching the first position for the first periodic pattern of the grating or, if present, the second periodic pattern.

According to some embodiments, when determining the one or more optical parameter, recordings from each of the n first periodic patterns and/or each of second periodic patterns are used; and when an iteration is performed, replacing the recorded measurement for the currently used periodic pattern with the latest recorded measurement for that periodic pattern.

When determining the one or more optical parameter using the assembly with the grating an array of the n last recorded measurement with different periodic patterns are kept. When a new recording is made using a periodic pattern, that recoding replaces the last measurement on that position in the array for that unique periodic pattern. If the second period pattern is present on the grating a corresponding array (or part of the same but extended array) is kept for the second periodic patterns. In this way a new and updated calculation for determining the one or more optical parameter can be made for each single new recoding. The effect is a real time result based on the n or n+m last recordings made, but updated for each single recording. Live measurement are thereby achieved.

Effects and features of the second and third aspects are to a large extent analogous to those described above in connection with the first aspect. Embodiments mentioned in relation to the first aspect are largely compatible with the the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1A:
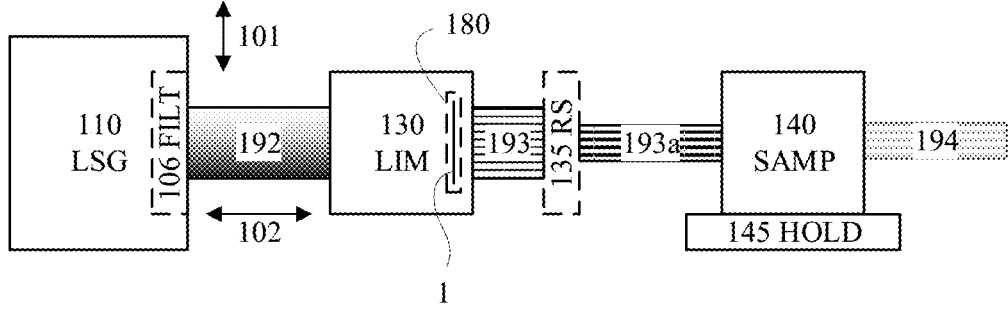
FIG. 1a shows a schematic block diagram illustrating an example assembly according to some embodiments viewed in the third spatial direction.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

As mentioned above, many conventional approaches to spectrophotometric measurements uses successively applied monochromatic beams to illuminate the sample of the medium under examination. To acquire information for more than one wavelength, a scan through all wavelengths of interest needs to be performed. Such approaches may be inefficient for performing measurements.

Another approach to spectrophotometric measurements is described in "Quantitative measurements of turbid liquids via structured laser illumination planar imaging where absorption spectrophotometry fails"; Regnima, et al.; Applied Optics, vol. 56, no. 13, May 2017, pp. 3929-3938, where two lasers are used having wavelengths 450 nm and 638 nm, respectively, and activating one laser at a time for measurements.

Further approaches to spectrophotometric measurements are described in WO 2012/015344 A1 and WO 2020/180233 A1.

In the following, embodiments will be described whereby efficient and accurate measurements are enabled. Furthermore, some embodiments provide increased flexibility in measuring optical properties of the medium under examination. Thereby, accurate measurements can be carried out by the same assembly for media having a wide range of various optical properties.

Generally, the term "measurements" may, for example, refer to spectrophotometric measurements.

Also generally, the term "optical parameters" may refer to any suitable optical parameter describing an optical property; such as, for example, an absorption coefficient, an attenuation coefficient (a.k.a. an extinction coefficient), a scattering coefficient, a fluorescence quantum yield (QY), a phosphorescence quantum yield (QY), etc. The extinction coefficient equals the sum of the absorption coefficient and the scattering coefficient. Other examples of optical properties include properties linked to one or more of: a concentration, an averaged cross-section, and a particle size (if there are particles in the medium). Thus, these parameters may also be derived. Hence, measuring an optical parameter may be defined as measuring an (the corresponding) optical property.

Also generally, the term "medium" may, for example, refer to a liquid, a gel, a solid medium, or a gas. Some common applications include liquid media. Some embodiments may be particularly suitable for measurements in relation to turbid and/or emitting media, wherein turbid includes scattering and absorption and emission includes photoluminescence (e.g., fluorescence and/or phosphorescence).

Also generally, exemplification by scattering is meant to be relevant also for emission of photoluminescing media, and vice versa.

Also generally, the term "light" refers to electromagnetic radiation having a wavelength within a certain range. This range may comprise what is commonly referred to as visible light (i.e., a portion of the electromagnetic radiation spectrum that is visible to the human eye). Alternatively or additionally, this range may comprise what is commonly referred to as non-visible light (i.e., a portion of the electromagnetic radiation spectrum that is not visible to the human eye), for example infrared (IR) light and/or ultraviolet (UV) light. The term "illumination" refers to irradiation by light as defined above.

Also generally, the term "polychromatic" describes something comprising two or more (visible or non-visible) wavelengths of the electromagnetic radiation spectrum.

Also generally, the term (single) optical sensor may refer to an array/matrix of constituent optical sensors (such as a digital camera where each pixel has a corresponding constituent optical sensor; an optical detector) or to a single optical sensor element (a single optical detector) that is configured to sweep over a recording area.

FIG. 1 schematically illustrates an example assembly according to some embodiments, for measurements of one or more optical parameters of a medium. Part (a) illustrates a side wave of one variant of the assembly and part (b) illustrate a top views of the assembly.

The assembly comprises a light sheet generator (LSG) 110, a light intensity modulator (LIM) 130, a holder (HOLD) 145 for a sample (SAMP) 140 of the medium, and an optical sensor (SENS) 161, 162.

The light sheet generator 110 is configured to provide a polychromatic light sheet 192, which comprises a light spectrum extending in a first spatial dimension 101 and has a propagation path in a second spatial dimension 102.

The second spatial dimension is non-parallel (typically orthogonal) to the first spatial dimension (e.g., in Euclidean coordinates). Together with a third spatial dimension 103 (which is non-parallel, typically orthogonal, to the first spatial dimension and to the second spatial dimension), the first and second spatial dimension spans a three-dimensional space. The terms "spatial dimension" and "dimension" will be used interchangeably herein.

A light sheet may, for example, be defined as light propagating along two or more paths in a single plane (e.g., in Euclidean coordinates).

That the light spectrum extends in the first spatial dimension may be understood as a light wavelength variation, which has the property that each coordinate along a path in the first spatial dimension experiences at most one wavelength of light.

The light intensity modulator (LIM) 130 comprises an optical holder 180 holding a grating 1 for modulating the light sheet 192. The light intensity modulator 130 is configured to provide an intensity modulated polychromatic light sheet 193, 193a by applying (to the polychromatic light sheet) an intensity modulation having a periodical—or substantially periodical—pattern in the first spatial dimension.

Figures 2, 3:
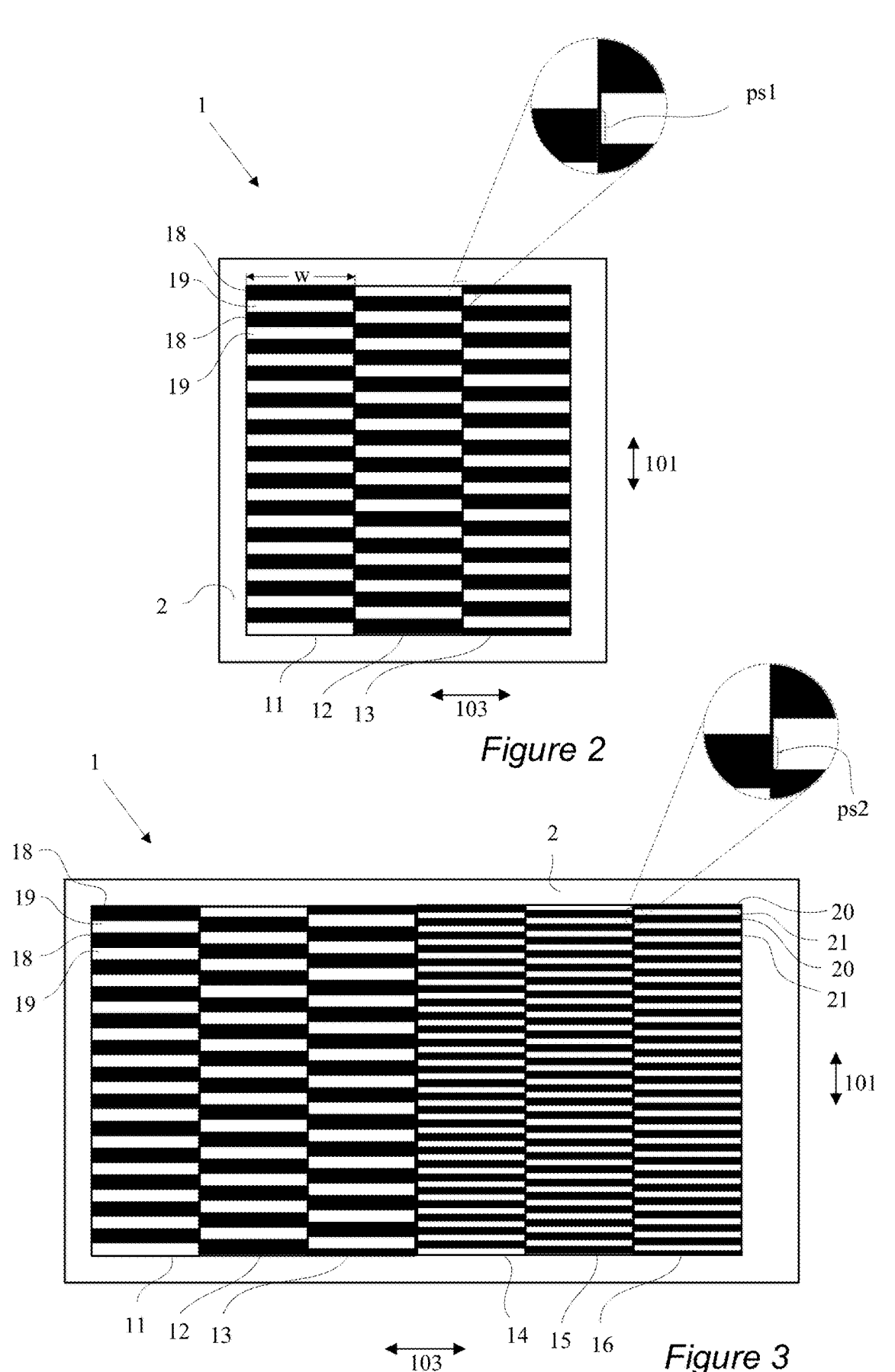
FIG. 2 shows an example of grating according to the present disclosure with a phase shift between a plurality of periodic patterns.
FIG. 3 shows an example of grating according to the present disclosure with a phase shift between a plurality of first periodic patterns and a plurality of second periodic patterns.

Examples of periodical patterns include patterns defined by a Ronchi ruling—i.e., a constant-interval bar and space square wave (e.g., equaling a when 2 kb≤x<(2 k+1)b, and equaling c when (2 k+1)b≤x<(2 k+2)b, k∈Z) as shown in FIG. 2—and patterns defined by a sinusoidal function. Examples of substantially periodical patterns include any pattern that alters between values below its mean value and values above its mean value in a certain periodicity over x, but where the values below its mean value and/or the values above its mean value can be different for different periods. Another example of a substantially periodical pattern is a pattern with a slight periodicity shift along x. Further periodic patterns may thereby be triangular masks, or any periodical pattern mask.

The light intensity modulator is, for example, be a Ronchi grating. One example Ronchi grating 1 is illustrated in FIG. 2. The Ronchi grating of FIG. 2 comprises a three first periodical patterns 11, 12, 13 placed next to each other. The middle first periodical pattern 12 has a phase shift ps1 of 120 degrees to the right first periodic pattern 13 and to the left first periodic pattern 11. The grating is intended to be movable to select one of the plurality of phase shifted periodical patterns for application. In the example of FIGS. 1b and 2, the grating would be movable in the third dimension 103 for this purpose.

The grating 1 comprises a base plate 2 extending in a plane in two spatial directions 102,103 and a plural number n of first periodic patterns 11,12,13, each with a surface 18 and space 19 periodic wave optical mask of the same interval frequency as shown in FIG. 2. The first periodic pattern 11,12,13 is arranged adjacent each other in the base plate 2 with a first phase shift ps1 between the masks of adjacent first periodic patterns. As disclosed in FIG. 2 the first phase shift ps1 is 360/n degrees. With n being three as in FIG. 2, the phase shift ps1 is 120 degrees.

Now referring to FIG. 3, the grating comprises a plural number m of second periodic patterns 14,15,16, each with a surface 20 and space 21 periodic wave optical mask of the same interval frequency; wherein the second periodic pattern 14,15,16 is arranged adjacent each other in the base plate 2 with a second phase shift ps2 between the masks of adjacent first periodic patterns; wherein the block of second periodic patterns are arranged adjacent the block of first periodic patterns. The second phase shift ps2 is 360/m degrees. The grating of FIG. 3 provides an opportunity to measure the one or more optical property using two different frequencies, where the phase shifted first periodic patterns 11, 12, 13 have a lower frequency than the towards each other phase shifted second periodic patterns 14, 15, 16.

Referring to FIGS. 2 and 3 each first periodic pattern 11,12,13 and each second periodic pattern 14,15,16 may have a width w of less than 50 mm in the third spatial dimension 103, e.g. when doing absorptions measurements using a round light profile. The first periodic pattern 11,12, 13 and each second periodic pattern 14,15,16 may have a width w of less than 10 mm, or less than 5 mm, or less than 2 mm, in the third spatial dimension 103 when using a polychromatic light sheet as in the assembly of FIGS. 1a and 1b. The narrower the width w, the faster is naturally the translation in the third spatial dimension to the next phase shifted period pattern in the grating 1 when operating the assembly of FIGS. 1a and 1b.

Referring again to FIGS. 1a and ab, the second aspect of this disclosure shows an assembly for measurements of one or more optical parameters of a medium, the assembly comprising: a light profile generator configured to provide a polychromatic light profile, wherein the polychromatic light profile has a propagation path in a second spatial dimension 102; a light intensity modulator 130 configured to provide an intensity modulated polychromatic light profile 193,193a by applying—to the polychromatic light profile—an intensity modulation having a periodical, or substantially periodical, pattern in the first spatial dimension; a holder 145 for a sample 140 of the medium, configured to enable the intensity modulated polychromatic light sheet to illuminate the sample; and an optical sensor 161,162 configured to record intensity of light 194,195 exiting the sample over the light spectrum for provision of the one or more optical parameters; wherein light intensity modulator 130 comprises: an optical holder 180 for a grating, the optical holder being electronically controlled and movable in a third spatial dimension 103; and a grating 1, shown in FIGS. 2 and 3, arranged in the optical holder for providing the intensity modulation to the polychromatic light profile.

Typically two or more (e.g., three as in FIGS. 2 and 3) phases are applied for different recordings to enable determination of an optical parameter. Also typically, each phase shift corresponds to a displacement of the modulation by a distance corresponding to the period of the modulation divided by the number n of recordings.

It may be preferable to have the light intensity modulator located as close to the sample as possible, to preserve the spatial modulation until the modulated light sheet enters the sample. This is inherently achieved by the approach where the light intensity modulator is an imprint on the container for the sample.

The holder 145 for the sample 140 of the medium is configured to enable the intensity modulated polychromatic light sheet to illuminate the sample. For example, the holder may be located in relation to the light intensity modulator and the light sheet generator such that, when the sample is provided at the holder, the intensity modulated polychromatic light sheet illuminates the sample.

Typically, the entire intensity modulated polychromatic light sheet illuminates the sample, but some embodiments may apply a solution where only part of the intensity modulated polychromatic light sheet illuminates the sample.

Preferably, the holder is configured such that the illumination of the sample is close to a side 141 of the sample that faces the optical sensor 162. This decreases the distance for the primarily scattered light (i.e., the single light scattering) to travel through the sample to reach the optical sensor.

The holder may, for example, be a stand for receiving the sample. The sample may be provided without any container (e.g., if the medium is solid, or a gel). Alternatively, the sample may be provided in a container (e.g., if the medium is liquid, or a gas), in which case the holder may be suitable for receiving the container with the sample comprised therein. An example container is a cuvette (e.g., a glass cuvette).

The optical sensor 162 is configured to record (over the light spectrum) intensity of light exiting the sample. The recorded intensity can then be used to determine the one or more optical parameters.

Typically, the optical sensor may be a camera (e.g., a charge-coupled device—CCD—camera or a scientific complementary metal-oxide-semiconductor—sCMOS—camera).

The optical sensor 162 is configured to record the intensity of light exiting the sample opposite to the illumination (so called transmitted light, illustrated as 194 in FIG. 1) and/or to record the intensity of light exiting the sample substantially orthogonal to the polychromatic light sheet (scattered or photoluminescence light, illustrated as 195 in FIG. 1).

Recording the intensity of light 195 exiting the sample substantially orthogonal to the polychromatic light sheet may be achieved by placing the optical sensor such that a straight line through the sample and the optical sensor is substantially orthogonal to the polychromatic light sheet, i.e., extends in the third dimension. This is illustrated by the optical sensor placement 162 in FIG. 1b.

Recording the intensity of light 194 exiting the sample opposite to the illumination may, be achieved by letting the assembly further comprise an optical reflector 150 in the propagation path of the polychromatic light sheet along the second spatial dimension, where the optical reflector is configured to reflect the light 194 of the intensity modulated polychromatic light sheet exiting the sample opposite to the illumination towards the optical sensor 162. Such an approach is illustrated in FIG. 1 b. The reflector may, for example, be a mirror or a diffusive glass layer.

According to this approach, a single, stationary optical sensor may be used for recording of the intensity of light exiting the sample opposite to the illumination and the intensity of light exiting the sample substantially orthogonal to the polychromatic light sheet; possibly in a single recording.

In some embodiments, this approach may further comprise an attenuator (e.g., a neutral density filter) or amplifier in the light path between the reflector and the optical sensor, to provide the light exiting the sample opposite to the illumination and the light exiting the sample substantially orthogonal to the polychromatic light sheet at similar intensity at the optical sensor. This avoids saturating the optical sensor while enabling recording of relatively small intensity variations. Other ways to avoid saturating the optical sensor while enabling recording of relatively small intensity variations include recording of the intensity of light exiting the sample opposite to the illumination and the intensity of light exiting the sample substantially orthogonal to the polychromatic light sheet in different recordings and varying the optical sensor exposure time and/or the light source intensity between recordings.

When recording the intensity of light 195 exiting the sample substantially orthogonal to the polychromatic light sheet (optical sensor placement 162) the optical sensor may typically be able to measure light intensity variations along an entire "width" 142 of the sample ("width" being an extension in the second dimension).

In some embodiments, the optical sensor recording the intensity of light exiting the sample substantially orthogonal to the polychromatic light sheet may be further configured to switch between recording light intensity variations along the entire width 142 of the sample and recording light intensity variations along a part of the width of the sample. The part is typically the part closest to the illumination of the sample. In some embodiments, the optical sensor may be configured to vary the size of the part. This feature may be achieved, for example, by use of a zooming function for the optical sensor, e.g., an objective lens, a telecentric objective, a zoom lens, or similar.

In connection to this approach of recording light intensity variations along a part of the width of the sample, it may be beneficial to let the assembly comprise a light sheet resizer (RS) 135, configured to provide the intensity modulated polychromatic light sheet in one of a plurality of available extensions in the first spatial dimension (e.g., in one of a plurality of available sizes or scales). This is illustrated in part (a) of FIG. 1 as the light sheet resizer shrinking the initial intensity modulated polychromatic light sheet 193 to provide a resized intensity modulated polychromatic light sheet 193a that has a smaller extension in the first spatial dimension. Thus, when the optical sensor zooms in to a part of the width of the sample (and inherently to a part of the "height" of the sample, "height" being an extension in the second dimension), the resized intensity modulated polychromatic light sheet 193a may be formed such that it can still be recorded in entirety by the optical sensor. The light sheet resizer 135 may, for example, be implemented by suitable application of one or more lenses and a Fourier filtering.

The third aspect of this disclosure shows a method of using the assembly according to the first aspect for measuring one or more optical parameters of a medium, the method comprising: providing the first aspect the holder with a sample of the medium; iterating at least n times the steps of: moving the optical holder 415 of the light intensity modulator 130 in the third spatial dimension so that light propagating in the assembly hits the next subsequent first periodic pattern 11,12,13 of the grating or, if present, second periodic pattern 14,15,16 thereby applying a modulation phase shift to the previous periodic pattern for light passing through the grating; illuminating 420 the sample by the polychromatic light sheet provided by the light sheet generator 110 and the light intensity modulator 130 of the assembly; recording 430, by the optical sensor of the assembly, at least one measurement of intensity of light 194 exiting the sample opposite to the illumination and intensity of light 195 exiting the sample substantially orthogonal to the polychromatic light sheet for each of the first periodic pattern 11,12,13 and, if present, second periodic pattern 14,15,16 during the periodic movement of the optical holder; and determining 460 the one or more optical parameters based on the recorded measurements. The recorded measurement is an image when operating the assembly shown in FIGS. 1*a* and 1*b*.

The iteration of the step of moving the optical holder is performed in one direction along the third spatial dimension until reaching the last position 13,16 for the first periodic pattern 11,12,13 of the grating or, if present, the second periodic pattern 14,15,16, and, after reaching the last position, change the movement direction for the next iteration to the opposite direction along the third spatial dimension until reaching the first position 11,14 for the first periodic pattern 11,12,13 of the grating or, if present, the second periodic pattern 14,15,16.

When determining the one or more optical parameter, recordings from each of the n first periodic patterns 11,12,13 and/or each of second periodic patterns 14,15,16 are used; and when an iteration is performed, replacing the recorded measurement for the currently used periodic pattern with the latest recorded measurement for that periodic pattern When determining the one or more optical parameter using the assembly with the grating an array of the n last recorded measurement with different periodic patterns are kept. When a new recording is made using a periodic pattern, that recoding replaces the last measurement on that position in the array for that unique periodic pattern. If the second period pattern is present on the grating a corresponding array (or part of the same but extended array) is kept for the second periodic patterns. In this way a new and updated calculation for determining the one or more optical parameter can be made for each single new recoding. The effect is a real time result based on the n last recordings made when using the grating of FIG. 2 or the n+m last recordings made when using the grating of FIG. 3, but updated for each single recording. Live measurement are thereby achieved.

FIG. 3 shows an example of grating according to the present disclosure with a phase shift between a plurality of first periodic patterns and a plurality of second periodic patterns.

Figure 4:
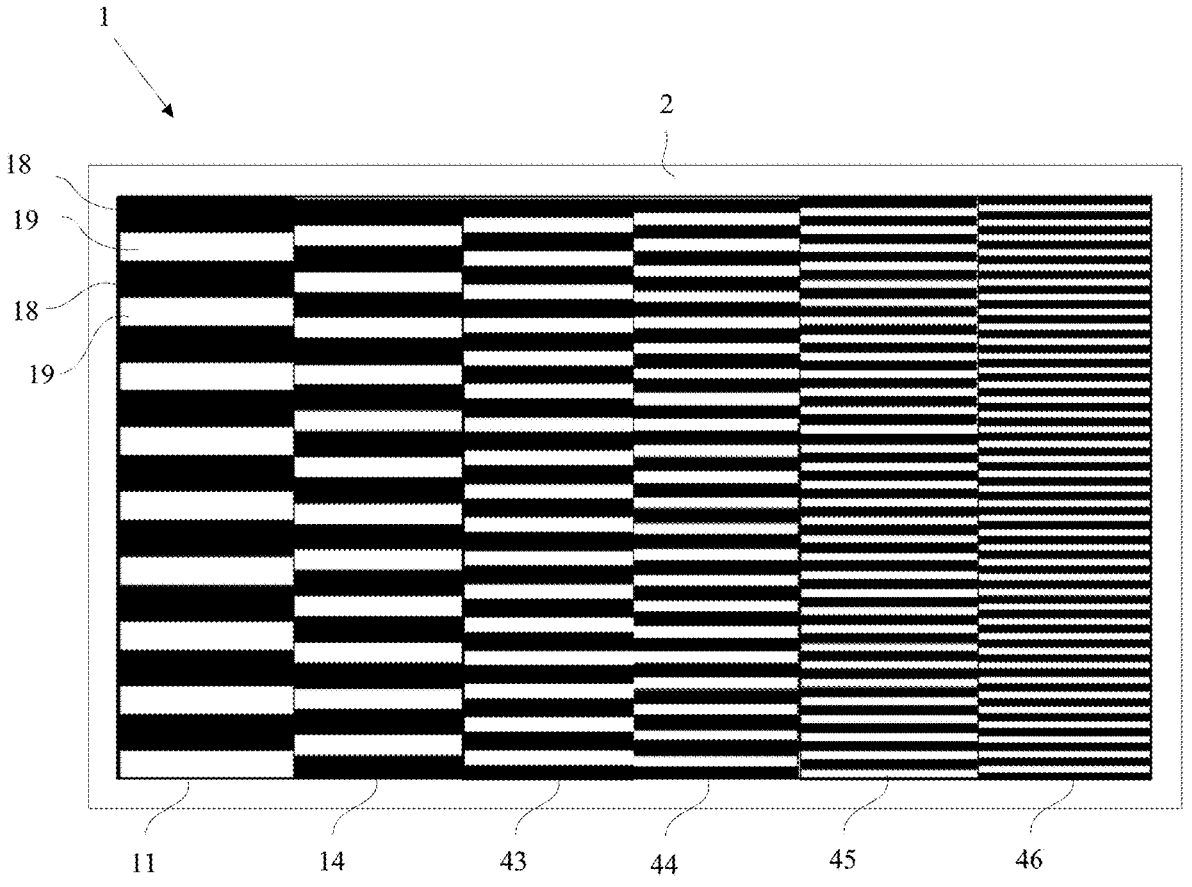
FIG. 4 shows an example of grating according to the present disclosure with a plurality of periodic patterns with different frequencies.

FIG. 4 shows a grating 1 for optical measurements comprising: a base plate 2 extending in a plane in two spatial directions 102,103; a plural number q of periodic patterns 11,14,43,44,45,46, each with a surface 18 and space 19 periodic wave optical mask and each with a different interval frequency; wherein the periodic patterns 11,14,43,44,45,46 are arranged adjacent each other in the base plate 2. FIG. 4 is an example of grating according to the present disclosure with six periodic patterns 11, 14, 43, 44, 45, 46 having six different frequencies. Under such condition 1-phase, instead of 2 or 3 phases as discussed above, can be used using an FFT post processing. An extinction coefficient of light traveling through a sample with particles would e.g. vary depending on the size of the particles. Large particles (Mie scattering) will show large variations of the extinction depending on frequency of the periodic pattern while small particle (close to Rayleigh scattering) will show low variations of the extinction coefficient depending on frequency of the periodic pattern.

Figure 5:
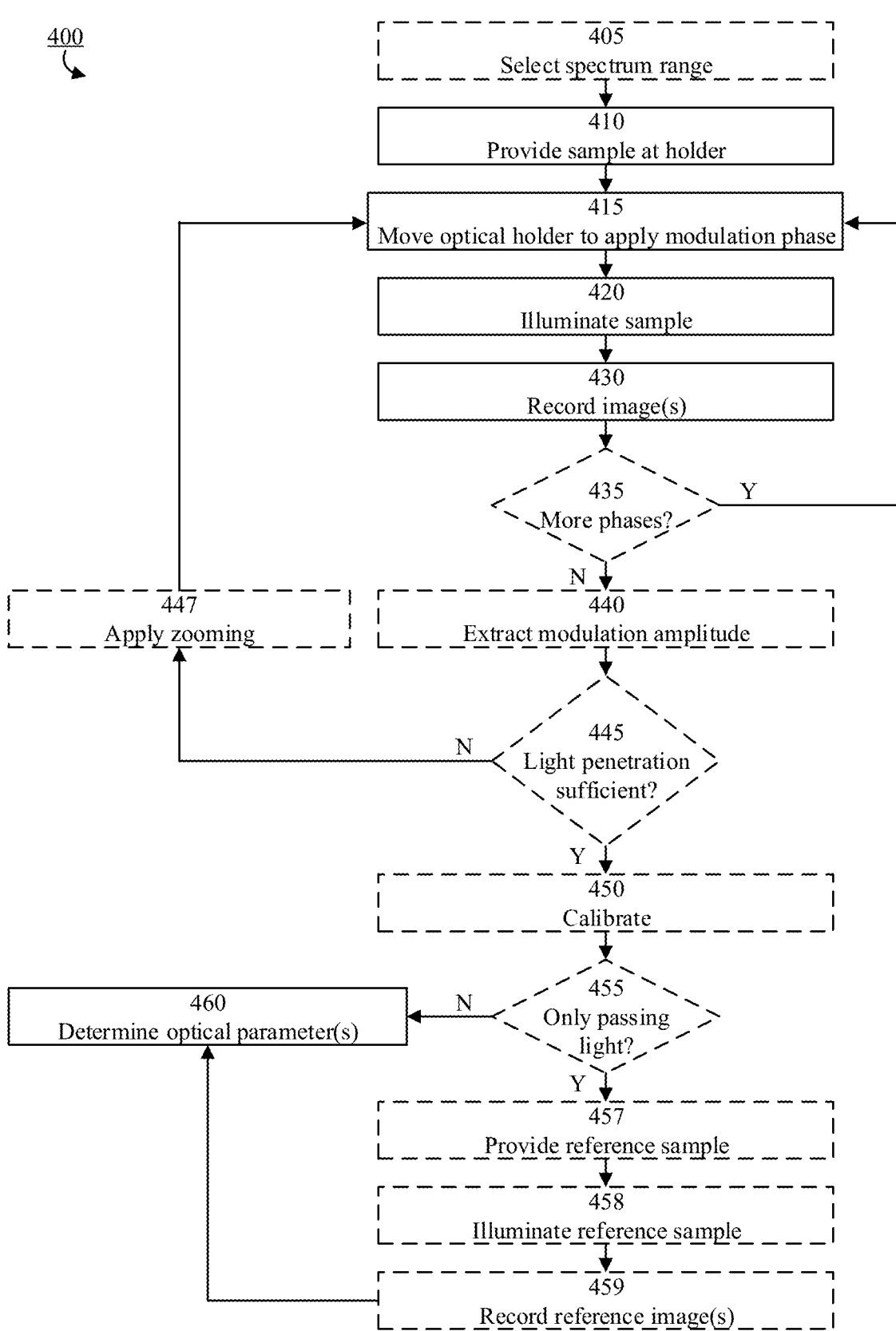
FIG. 5 shows is a flowchart illustrating example method steps according to some embodiments.

FIG. 5 is a flowchart illustrating an example method 400 of using of an assembly (e.g., any of the assembly variants described in connection with FIGS. 1-3) for measuring one or more optical parameters of a medium.

The method may begin in optional step 405, where a range of a light spectrum of the polychromatic light sheet (e.g., 192) to be generated at the assembly is selected. This may be achieved, for example, by varying the position of a tiltable dispersive element (e.g., 204) as exemplified above in connection with FIG. 2. Another way to achieve the selection of optional step 405 is to remove the dispersive element and insert another dispersive element at its place. Yet another way to achieve the selection of optional step 405 is to employ a dispersive element having two or more parts, wherein different parts result in different dispersions, and wherein the dispersive element is movable to select one of the parts for application (consider analogy with the Ronchi grating 330 of FIG. 3).

In step 410, a sample of the medium is provided at a holder of the assembly, such that (e.g., by location and/or orientation) an intensity modulated polychromatic light sheet to be provided at the assembly will illuminate the sample.

As mentioned above in connection with FIGS. 1, 2 and 3, the periodic pattern used in the grating 1 of the intensity modulation is periodical and different phases and/or frequencies are applied for different measurements of the same sample. In FIG. 2 three different phases are applied. In FIG. 3 three different phases of a first periodic pattern having a first frequency and three different phases of a second periodic pattern having a second higher frequency are applied. In FIG. 4 six different frequencies of six periodic patterns are applied. In step 415, the phase shift or frequency is decided by the grating 1 used for the upcoming measurement. The phase shift or frequency shift is achieved by movement of the grating 1 in the third spatial direction. When using grating of FIG. 3 also a second frequency of the modulation is provided.

In step 420, the sample is illuminated by the intensity modulated polychromatic light sheet (e.g., by switching on a light source of a light sheet generator configured to provide a polychromatic light sheet being intensity modulated by a light intensity modulator as exemplified above).

The modulated illumination enables determination of the single light scattering intensity from the measurement of the modulation amplitude of the recorded signal. Application of different phases (by displacing the modulation) makes it possible to determinate the intensity of the single light scattering for the entire wavelength range at interest.

For example, from images of measurements for different phases, a reconstructed image may be created after image post-processing such that the reconstructed image is free from multiple light scattering intensities and from unwanted reflections. The reconstructed image can thus be used to estimate the extinction coefficient of the medium of the sample more accurately than if multiple light scattering intensities could not be suppressed.

Figure 1B:
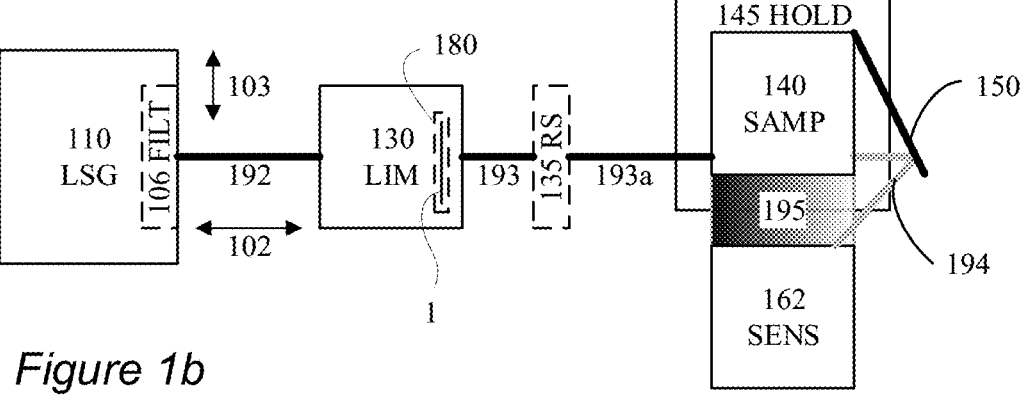
FIG. 1b shows a schematic block diagram illustrating the example assembly shown in FIG. 1a viewed in the first spatial direction.

In step 430, at least one image is recorded—by an optical sensor—of intensity of light exiting the sample opposite to the illumination and of intensity of light exiting the sample substantially orthogonal to the polychromatic light sheet as exemplified above in connection with FIG. 1*a* and FIG. 1*b*.

If more phases are to be measured (Y-path out of optional step 435), the method returns to 420 where a new phase is applied, and step 430 is repeated for the new phase. If no more phase are to be measured (N-path out of optional step 435), the method proceeds to optional step 440.

In optional step 440, the modulation amplitude is extracted from the recorded images. For example, this may be achieved by post-processing the recoded image(s) and extracting the amplitude of the recorded modulation for both intensity of light exiting the sample opposite to the illumination (detection of transmitted signal) and intensity of light exiting the sample substantially orthogonal to the polychromatic light sheet (side detection). As mentioned above, the modulation amplitude may be used to discriminate between first and higher order scattering, for example.

In optional step 445, it is determined whether the penetration of light into the sample is sufficient for extracting the information at interest from the recorded image(s). For example, optional step 445 may comprise determining whether the extracted modulation amplitude is higher than a threshold value to determine whether the penetration of light into the sample is sufficient.

If the penetration of light into the sample is not sufficient (N-path out of optional step 445), the method may comprise applying zooming in optional step 447, and returning to step 420 for repeating the measurements with the zooming applied. Application of zooming may be achieved, for example, by use of a zooming function for the optical sensor in combination with resizing the initial intensity modulated polychromatic light sheet.

If the penetration of light into the sample is sufficient (Y-path out of optional step 445), the method may continue to optional step 450, where the measurement may be calibrated. For example, the calibration may comprise application of displaceable monochromatic filter(s) (or filters with a relatively narrow bandwidth) to provide spatial calibration of the light spectrum.

If there is scattering and/or photoluminescence, i.e., if light is exiting the sample substantially orthogonal to the polychromatic light sheet, (N-path out of optional step 455) the optical parameter(s) of interest are determined based on the recorded image(s) in step 460. For example, step 460 may comprise extracting optical properties from the "side detection" including deducing the exponential decay if intensity for each wavelength by using the Beer-Lambert law along the direction of light propagation.

If there is no (or very low) scattering and/or photoluminescence, i.e., if light is exiting the sample only opposite to the illumination—only passing light, (Y-path out of optional step 455), then the method continues to optional steps 457, 458 and 459. In these three steps, a reference sample is provided (compare with step 410), the reference sample is illuminated (compare with step 415), and one or more images are recorded for the reference sample (compare with step 430 for light exiting the sample opposite to the illumination). A reference sample may be a sample of a medium with known optical properties. Thereby, measurements performed in step 430 can be put in relation to measurements performed in step 459 to determine the optical parameter(s) of interest based on the recorded image(s) in step 460. For example, step 460 may comprise extracting optical properties from "detection of transmitted signal" using the Beer-Lambert law, measured intensity of the reference sample, and the "width" of the sample (e.g., cuvette path length).

Optional step 455 may, for example, be implemented by comparing the intensity of light exiting the sample opposite to the illumination to a threshold value associated with the intensity of light of the illumination, and concluding that there is no (or very low) scattering and/or photoluminescence if the intensity is above the threshold value.

According to some embodiments, it is enabled to perform—using the same assembly—measurements for conventional transmission spectrometer features (with possibly increased precision), measurements for turbid media extinction, and measurements for evaluation of the quantum yield (QY) of fluorescent dyes.

Quantum yield estimation of fluorescent dyes may be achieved based on quantitative measurement of the signal emitted for fluorescents dyes. For example, the estimation may include comparing the raw signal emitted by the dye as a function of the wavelength with the emission of a reference dye with a known QY (RhB for example). Such measurements (the raw signal and/or emission of the reference dye) are typically highly simplified with application of approaches described herein, since there is no need to involve the use of an integration sphere or multiple concentration measurements.

In an example principle of the estimation, the fluorescent signal emitted by a dye can be written $F_s = K_{optic} QY(\lambda)\epsilon(\lambda) I_0$, where $\lambda$ is the wavelength, $I_0$ is the excitation intensity, $\epsilon$ is the absorption coefficient of the dye, QY is the quantum yield, and $K_{optic}$ gathers the optical factors such as the collection angle, the chromatic filtering of the lenses, etc. These parameters remain constant between two measurements. Since a reference dye is known (QY and $\epsilon$), the fluorescence intensity for one wavelength can be written $F_{s_{ref}} = K_{optic} QY_{ref}(\lambda)\epsilon_{ref}(\lambda)I_0$. Given that the spectrometer allows the measurement of the absorption coefficient $\epsilon(\lambda)$, the QY can be deduced from the absolute signal intensity $$F_s/F_{s_{ref}} = \frac{QY(\lambda)\epsilon(\lambda)}{QY_{ref}(\lambda)\epsilon_{ref}(\lambda)},$$

which means that the QY can be deduced by $$QY(\lambda) = \frac{QY_{ref}(\lambda)\epsilon_{ref}(\lambda) \; F_s/F_{s_{ref}}}{\epsilon(\lambda)}.$$

In some situations, corrections may be beneficial due to, for example, the reabsorption along the collection path and the decay of the excitation intensity.

According to some embodiments of the various approaches presented herein, the intensity modulation may enable removal (or at least suppression) of one or more of: background noise, background reflections, diffused transmitted light.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A grating for optical measurements comprising:
a base plate extending in a plane in two spatial directions;
a plural number q of periodic patterns, each with a surface and space periodic wave optical mask and each with a different interval frequency;
wherein the periodic patterns are arranged adjacent each other in the base plate;
a plural number n of first periodic patterns, each with a surface and space periodic wave optical mask of the same interval frequency;
a plural number m of second periodic patterns, each with a surface and space periodic wave optical mask of the same second interval frequency;
wherein the second periodic pattern is arranged adjacent each other in the base plate with a second phase shift (ps2) between the masks of adjacent second periodic patterns;
wherein the first periodic pattern is arranged adjacent each other in the base plate with a first phase shift (ps1) between the masks of adjacent first periodic patterns; and
wherein a block of second periodic patterns is arranged adjacent a block of first periodic patterns and wherein the first interval frequency is different from the second interval frequency.

2. The grating according to claim 1, wherein the first phase shift (ps1) is 360/n degrees.

3. The grating according to claim 1, wherein the periodic patterns is comprised in the group consisting of: Ronchi masks, sinusoidal masks, triangular masks, or any periodical pattern mask.

4. The grating according to claim 3, wherein the second phase shift (ps2) is 360/m degrees.

5. The grating according claim 1, wherein a first periodic pattern and a second periodic pattern have a width (w) of less than 50 mm in a third spatial dimension.

6. The grating according to claim 1, wherein each first periodic pattern and each second periodic pattern have a width (w) of less than 10 mm in a third spatial dimension.

7. The grating according to claim 1, wherein each first periodic pattern and each second periodic pattern have a width (w) of less than 5 mm in a third spatial dimension.

8. The grating according to claim 1, wherein each first periodic pattern and each second periodic pattern have a width (w) of more than 2 mm in a third spatial dimension.

9. A method of measuring one or more optical parameters of a medium, comprising:

using an assembly comprising:
a light profile generator configured to provide a polychromatic light profile, wherein the polychromatic light profile has a propagation path in a second spatial dimension;
a light intensity modulator configured to provide an intensity modulated polychromatic light profile by applying—to the polychromatic light profile—an intensity modulation having a periodical, or substantially periodical, pattern in a first spatial dimension;
a holder for a sample of the medium, configured to enable the intensity modulated polychromatic light sheet to illuminate the sample; and
an optical sensor configured to record intensity of light exiting the sample over a light spectrum for provision of the one or more optical parameters;
wherein light intensity modulator comprises:
an optical holder for a grating, the optical holder being electronically controlled and movable in a third spatial dimension;
a grating according to claim 1 arranged in the optical holder for providing the intensity modulation to the polychromatic light profile;
providing the holder with a sample of the medium;
iterating at least n times the steps of:
moving the optical holder of the light intensity modulator in the third spatial dimension so that light propagating in the assembly hits a next subsequent periodic pattern of the grating;
illuminating the sample by the polychromatic light sheet provided by the light sheet generator and the light intensity modulator of the assembly;
recording, by the optical sensor of the assembly, at least one measurement of intensity of light exiting the sample opposite to the illumination and intensity of light exiting the sample substantially orthogonal to the polychromatic light sheet for each of the first periodic pattern during a periodic movement of the optical holder; and
determining the one or more optical parameters based on the recorded measurements.

10. The method according to claim 9, wherein the light profile generator is configured to provide a polychromatic light sheet comprising a light spectrum extending in a first spatial dimension.

11. The method according to claim 10, wherein the recorded measurement is an image.

12. The method according to claim 10, wherein the iteration of the step of moving the optical holder is performed in one direction along the third spatial dimension until reaching the last position for the periodic patterns of the grating, and, after reaching the last position, change the movement direction for the next iteration to the opposite direction along the third spatial dimension until reaching a first position for the periodic patterns of the grating.

13. The method according to claim 10, wherein when determining the one or more optical parameter, recordings from each of the n first periodic patterns and/or each of second periodic patterns are used, or each of the q periodic patterns; and
when an iteration is performed, replacing the recorded measurement for the currently used periodic pattern with the latest recorded measurement for that periodic pattern.

* * * * *